Nov. 10, 1925.

P. D. CHAMBERLAIN

SPRING SUSPENSION FOR FORD CARS AND TRUCKS

Filed Nov. 28, 1924

Inventor
Paul David Chamberlain
By Fredrick E. Bromley
Atty

Patented Nov. 10, 1925.

1,560,759

UNITED STATES PATENT OFFICE.

PAUL DAVID CHAMBERLAIN, OF FAIRBANK, ONTARIO, CANADA.

SPRING SUSPENSION FOR FORD CARS AND TRUCKS.

Application filed November 28, 1924. Serial No. 752,820.

*To all whom it may concern:*

Be it known that I, PAUL DAVID CHAMBERLAIN, a subject of the King of Great Britain, resident of the town of Fairbank, in the Province of Ontario, in the Dominion of Canada, have invented new and useful Improvements in Spring Suspensions for Ford Cars and Trucks, of which the following is a specification.

The invention relates to improvements in spring suspensions for Ford cars and trucks as described in the present specification and shown in the accompanying drawings which form part of the same.

The frame body of the well known Ford motor vehicle is mounted upon a pair of inverted semi-elliptical springs which are shackled to the axles of the running gear. These form to all intents and purposes a two-point mounting for the car body which in practice has a great tendency to sway and tilt from one side to another; hence it is the object of the present invention to provide auxiliary springs for the purpose of checking this swaying action and further function to absorb shocks and rebound of the main springs in order to effect smoother running of the vehicle.

The invention consists substantially of springs rigidly mounted on each of the axles of the car or truck and engaging the frame of the car body at each of its corners.

Referring to the drawings; Figure 1 is a fragmentary front view of a Ford car showing one of the auxiliary springs applied thereto.

Like numerals indicate corresponding parts throughout each figure of the drawings.

Figure 1:
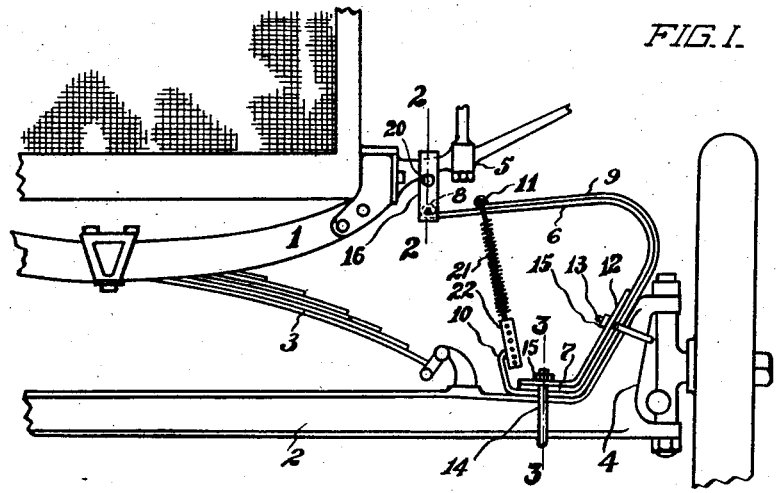
Figures 2, 3:
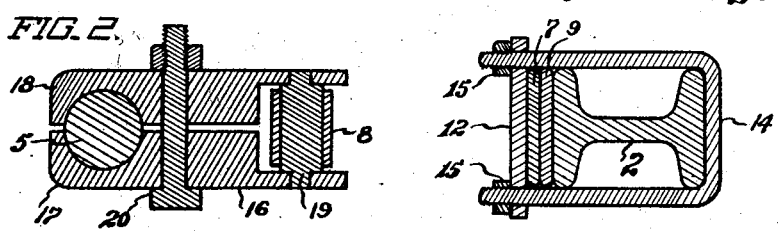
Figure 2 is a transverse sectional view taken on the line 2—2 of Figure 1.
Figure 3 is a further transverse sectional view taken on the line 3—3 of Figure 1.

In the drawings, 1 designates the frame of the vehicle and 2 the front axle which is connected to said frame by the semi-elliptical spring 3. 4 is the steering knuckle of the axle and 5 is the lamp bracket which is carried by the frame 1.

With regard to the auxiliary springs, each of the front ones are identical in construction and are positioned one upon each side of the car body. By reason of their similarity, a description of one of them will serve for either.

6 is a lower leaf substantially V-shaped, one end 7 being bent to follow the contour of the steering knuckle of the axle. The other end of this leaf is extended to a point beneath the lamp bracket 5 of the car, where it terminates in an eye 8. 9 is an upper leaf of a similar shape and is arranged contiguous with the lower leaf. The lower extremity of this leaf is likewise bent to follow the contour of the steering knuckle and is also provided with an upturned extension 10 which terminates in a further eye. The other end of this leaf is extended to a point just short of the eye 8 of the lower spring 6 and is likewise formed into a further eye 11.

12 is a bent plate slightly greater in width than the leaves 6 and 9 and positioned thereover at the steering knuckle. The said plate is rigidly clamped to the front axle by a pair of U-clamps 13 and 14 having nuts threadedly engaged over their extremities as at 15. These clamps 13 and 14 with their plate 12 rigidly secure the two leaves of the spring to the car axle. The lower spring 6 is connected to the lamp bracket 5 by a shackle 16 comprising a pair of members 17 and 18 which are recessed at one end to receive a lamp bracket. The other end of the same are cut away to receive a roller 19 which is passed through the eye 8 of the lower spring.

A bolt 20 rigidly clamps the two parts of the shackle together in order to form a rigid connection with the lamp bracket.

21 is a helical spring connected to the eye 11 of the upper spring 9 at one of its ends and to the extension 10 of the lower spring at its other end by means of an adjustable plate 22. This plate carries a series of perforations which can be selectively engaged by a bolt or pin for the purpose of adjusting the tension of the spring 21.

Figure 4:
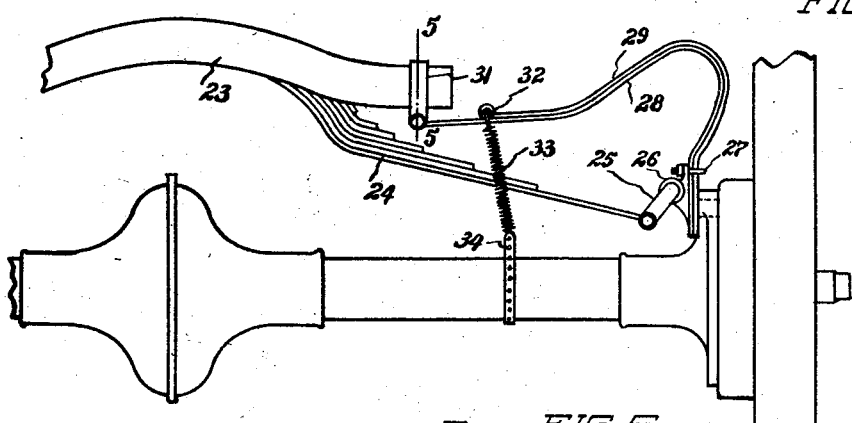
Figure 4 is a fragmentary rear view of the chassis.
Figures 5, 6:
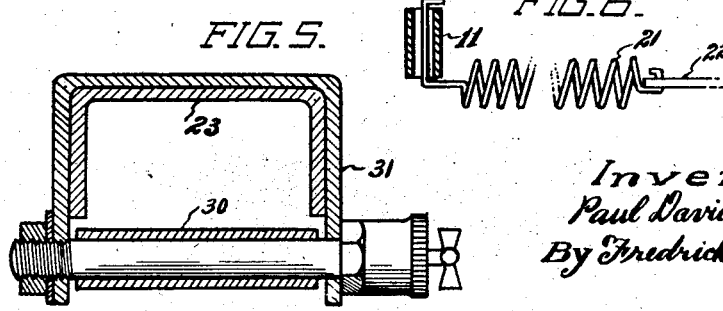
Figure 5 is a cross sectional view taken on the line 5—5 of Figure 4.
Figure 6 is a detail of a helical spring.

Adverting now to the Figures 4 and 5, the auxiliary spring herein disclosed is installed upon the rear axle of the vehicle, one such spring upon each side of the body as in the case of the front springs, and by reason of these two rear springs being identical in construction, a description of one of them will suffice for both.

In these two views, 23 denotes the rear cross member of the frame and 24 the main spring which is connected thereto. This main spring is shackled to the rear axle by a shackle 25 which is carried by a special perch 26 comprising a clamp 27 similar to the clamps 13 and 14 of the front spring. 28 is a lower leaf corresponding to the lower leaf 6 of the front spring and 29 is the upper leaf likewise corresponding to the upper leaf 9. These two leaves are rigidly clamped at one end by the perch clamp 27; the other end of the leaf 28 terminates in an eye 30 which is connected to a shackle 31, while the end of the other leaf 29 terminates in a further eye 32 which in turn is connected to a helical spring 33 similar to the spring 21 aforementioned.

This spring is adjustably connected to the rear axle by a plate 34 having perforations for selective engagement in order to adjust the tension of its spring in similar manner as recounted in the description of the front springs.

In the use of this invention; as the main springs 3 and 24 are deflexed the weight of the car body is thrown upon the lower leaves 6 and 28 which function to absorb the force, while the upper leaves 9 and 29 operate to absorb the rebound action of the main springs. These auxiliary springs, therefore, not only function as shock absorbers but also act as snubbers and by their action tend to relieve stress upon the main springs of the vehicle, thus reducing wear and tear and prolonging their life.

What I claim is:

1. In a device of the class described, the combination with the frame and axle of the chassis, of a pair of contiguously arranged leaf-springs, means for rigidly connecting one of their ends to said axle, means for connecting the other end of the lowermost leaf to the frame, and a coil spring for exerting downward pressure upon the free end of the uppermost spring.

2. In a device of the class described, the combination with the frame and axle of the chassis, of an upper and lower leaf-spring contiguously arranged, means for rigidly connecting one of their ends to said axle, a shackle connecting the other end of the lower leaf to the frame, and a coil spring for exerting downward pressure upon the free end of the upper leaf.

3. In a device of the class described, the combination with the frame and axle of the chassis, of an upper and lower leaf-spring contiguously arranged, means for rigidly connecting one of their ends to said axle, such means comprising a bearing plate and U-clamps, a shackle connecting the other end of the lower leaf to the frame, and a coil spring for exerting downward pressure upon the free end of the upper leaf.

4. In a device of the class described, the combination with the frame and axle of the chassis, of an upper and lower leaf-spring contiguously arranged, means for rigidly connecting one of their ends to said axle, a shackle connecting the other end of the lower leaf to the frame, a coil spring affixed to the free end of the upper leaf, and means adjustably securing this coil spring to the aforesaid axle.

5. In a device of the class described, the combination with the frame and axle of the chassis, of an upper and lower leaf-spring contiguously arranged and substantially bent intermediate of their lengths, means for rigidly connecting one of their ends to said axle, such means comprising a bearing plate and U-clamps; a shackle connecting the other end of the lower leaf to the frame, a coil spring affixed to the free end of the upper leaf, and a perforated strap adjustably securing the coil spring to the aforesaid axle.

Signed at Toronto, Ontario, Canada, this 17th day of November 1924.

PAUL DAVID CHAMBERLAIN.